United States Patent [19]

Maker

[11] Patent Number: 5,301,405

[45] Date of Patent: Apr. 12, 1994

[54] MILLING MACHINE LATHE ATTACHMENT

[76] Inventor: Richard A. Maker, 281 W. Main St., Littleton, N.H. 03561

[21] Appl. No.: 2,967

[22] Filed: Jan. 11, 1993

[51] Int. Cl.$^5$ .............................................. B23C 9/00
[52] U.S. Cl. ..................................... 29/26 A; 82/171; 409/219; 409/240
[58] Field of Search ............... 409/163, 197, 198, 165, 409/166, 219, 240, 242; 408/20, 103, 104, 106; 29/26 B, 26 A, 27 R; 82/171, 128, 152

[56] References Cited

U.S. PATENT DOCUMENTS

| | | | |
|---|---|---|---|
| 322,992 | 12/1965 | Ettorre et al. | 409/165 |
| 3,461,776 | 8/1969 | Hamori et al. | 409/219 |
| 3,835,528 | 9/1974 | Garrett | 409/240 |
| 4,057,893 | 11/1977 | Smith et al. | 409/240 |

FOREIGN PATENT DOCUMENTS

| | | | |
|---|---|---|---|
| 136704 | 6/1986 | Japan | 408/103 |
| 2025282 | 1/1980 | United Kingdom | 29/26 A |

Primary Examiner—Daniel W. Howell

[57] ABSTRACT

The milling machine lathe attachment is attachable to an existing milling machine so as to eliminate the need for an operator owning both a milling machine and a lathe. It is designed to be mounted to the side of the milling machine and to be used without disturbing a setup in the associated vise. The attachment is also designed to be mounted to the front of a milling machine and allows the programming of the very point of single point tool contact so as to follow whatever contour or steps are desired. This type of cutting is not possible on a lathe with guaranteed accuracy, while on a milling machine it is quite feasible.

2 Claims, 4 Drawing Sheets

MILLING MACHINE LATHE ATTACHMENT

BACKGROUND OF THE INVENTION

1. Field of the Invention

The present invention relates generally to milling machines, and in particular to an attachment for a milling machine which allows the milling machine to function as a lathe.

2. Description of the Prior Art

Vertical milling machines are used extensively to perform a variety of machining operations and are well known in the prior art. These types of machining operations include drilling, reaming, lapping, etc., wherein a vertically oriented tool is removably secured in and projects downwardly from the lower end of a power driven spindle. By the same token, lathes also are used to cut metallic objects and utilize a chuck and rotatable spindle to hold a toolstock in a horizontal position. Both of these machines are separably and differently operable, and a good machine shop must purchase both machines to be able to handle all types of commercial operations. Due to the extreme expense associated with the purchase of both machines, it would appear that there exists a need for some type of machine which could perform both milling and lathe operations, thereby to substantially reduce the overall expense, and in this respect, the present invention substantially fulfills this need.

SUMMARY OF THE INVENTION

In view of the foregoing disadvantages inherent in the known types of milling machines and lathes now present in the prior art, the present invention provides an improved combined milling machine and lathe construction wherein the same can be utilized to perform both milling and lathe type operations. As such, the general purpose of the present invention, which will be described subsequently in greater detail, is to provide a new and improved combined milling machine and lathe assembly which has all the advantages of the prior art milling machines and lathes and none of the disadvantages.

To attain this, the present invention essentially comprises a milling machine lathe attachment which is attachable to an existing milling machine so as to eliminate the need for an operator owning both a milling machine and a lathe. It is designed to be mounted to the side of the milling machine and to be used without disturbing a setup in the associated vise. The attachment is also designed to be mounted to the front of a milling machine and allows the programming of the very point of single point tool contact so as to follow whatever contour or steps are desired. This type of cutting is not possible on a lathe with guaranteed accuracy, while on a milling machine it is quite feasible.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved milling machine attachment which has all the advantages of the prior art milling machine attachments and none of the disadvantages.

It is another object of the present invention to provide a new and improved milling machine attachment which may be easily and efficiently manufactured and marketed.

It is a further object of the present invention to provide a new and improved milling machine attachment which is of a durable and reliable construction.

An even further object of the present invention is to provide a new and improved milling machine attachment which is susceptible of a low cost of manufacture with regard to both materials and labor, and which accordingly is then susceptible of low prices of sale to the consuming public, thereby making such milling machine attachments economically available to the buying public.

Still yet another object of the present invention is to provide a new and improved milling machine attachment which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
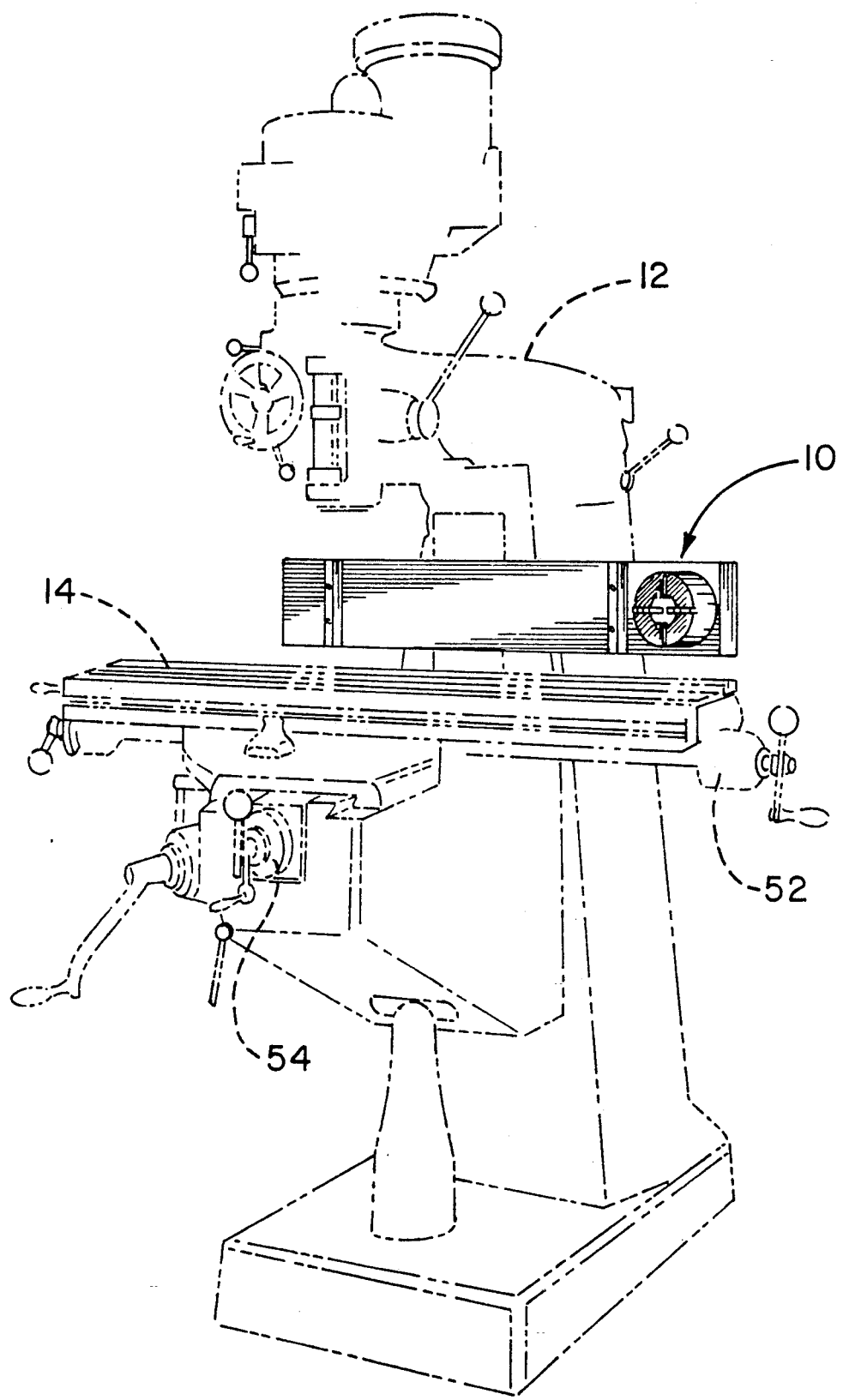
FIG. 1 is a perspective view of the milling machine lathe attachment comprising the present invention showing the same attached to a milling machine.

With reference now to the drawings, and in particular to FIG. 1 thereof, a new and improved milling machine lathe attachment embodying the principles and concepts of the present invention and generally designated by the reference numeral 10 will be described.

More specifically, it will be noted that the milling machine lathe attachment 10 is designed to be directly attached to an existing milling machine 12 in the manner illustrated in FIG. 1 utilizing existing dovetailed connection blocks on the milling machine. The milling machine lathe attachment 10 is designed to be mounted proximate the moveable work table 14 associated with the milling machine 12 and allows the milling machine to function as a lathe whereby the need for a separate expensive lathe is eliminated.

FIGS. 2-6 illustrate the basic components of the present invention. In this respect, the milling machine lathe attachment 10 includes a conventional toolstock holding chuck 16 which is rotatably mounted to a chuck support 18. A motor mount 20 is fixedly secured to the chuck support 18, and an electrically powered motor 22 is attached to the motor mount. The lathe chuck 16 is provided with a pulley 24, and the motor 22 is provided with a further drive pulley 26. A conventional drive belt 28 is mounted between the pulleys 24, 26 whereby the motor 22 can be utilized to rotate the lathe chuck 16 in a now apparent manner.

Figure 2:
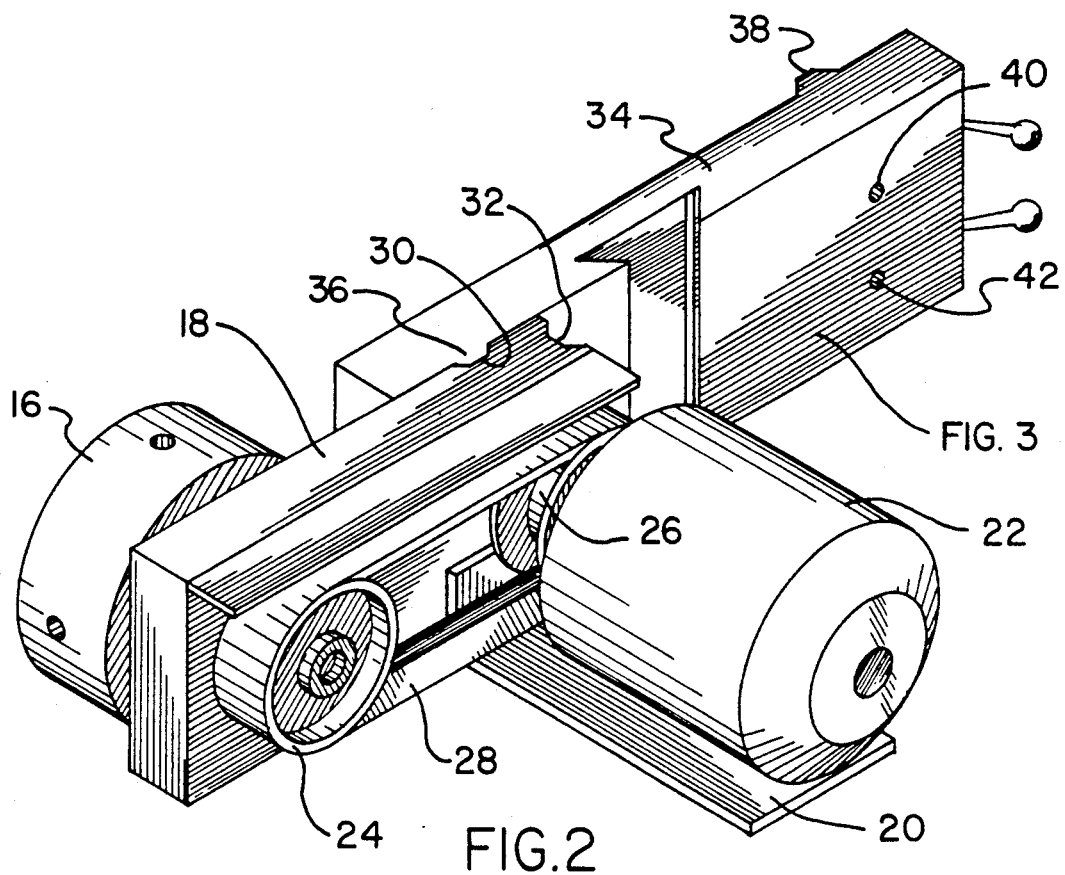
FIG. 2 is a rear perspective view of the invention.
Figure 3:
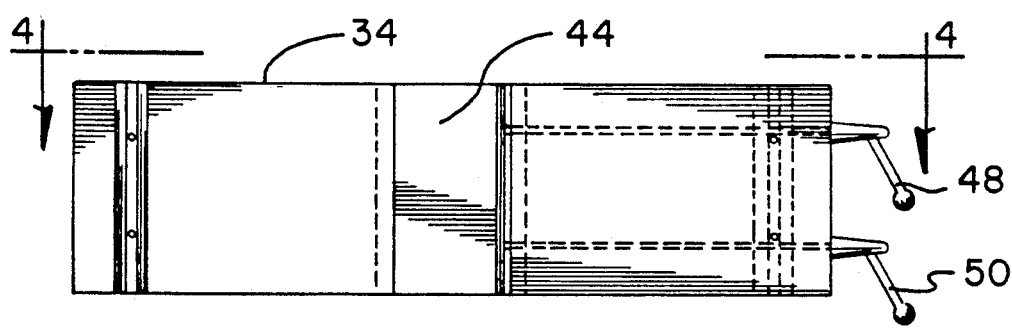
FIG. 3 is a bottom plan view of the invention.
Figure 4:
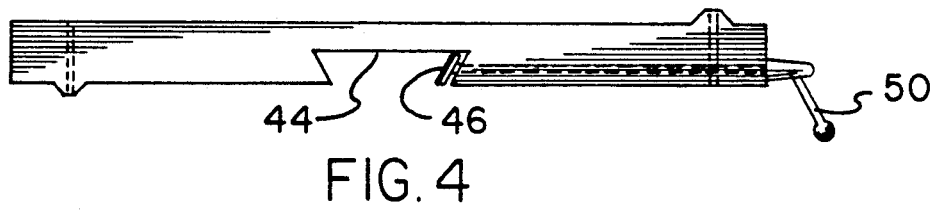
FIG. 4 is a cross-sectional view of the invention as viewed along the line 4—4 in FIG. 3.
Figure 5:
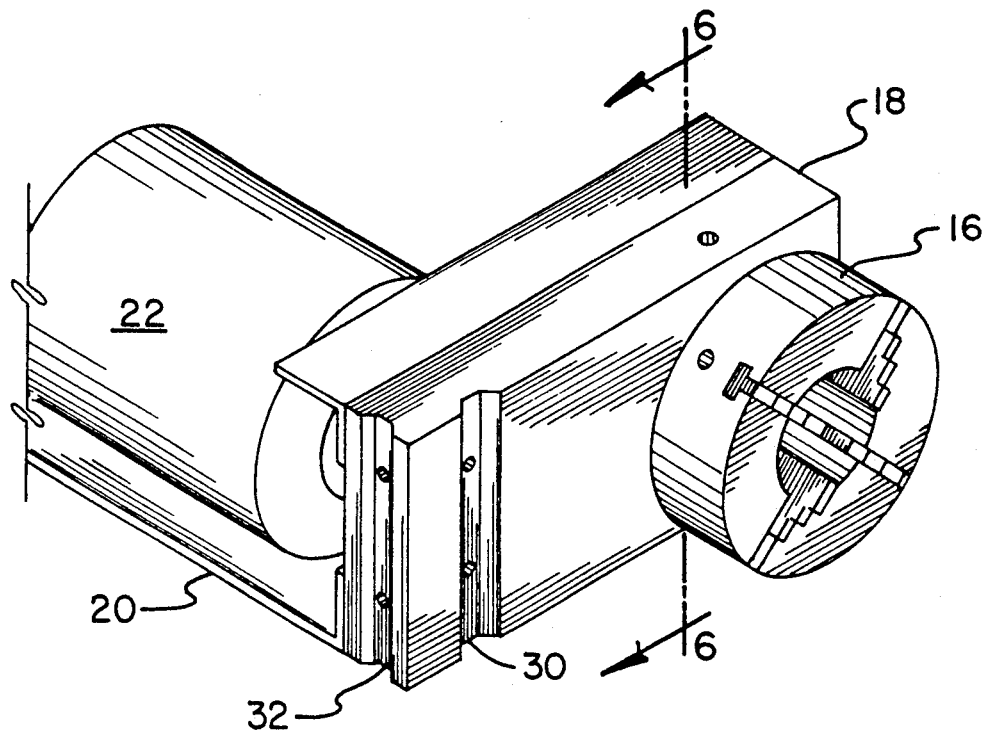
FIG. 5 is a partial front perspective view of the invention.
Figure 6:
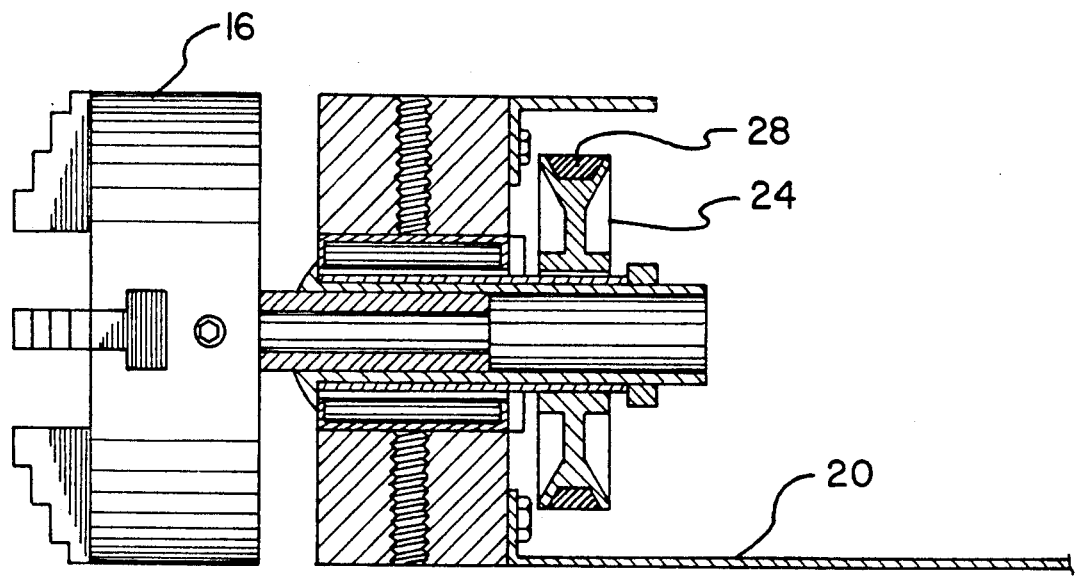
FIG. 6 is a cross-sectional of the invention as viewed along the line 6—6 in FIG. 5.
Figure 7:
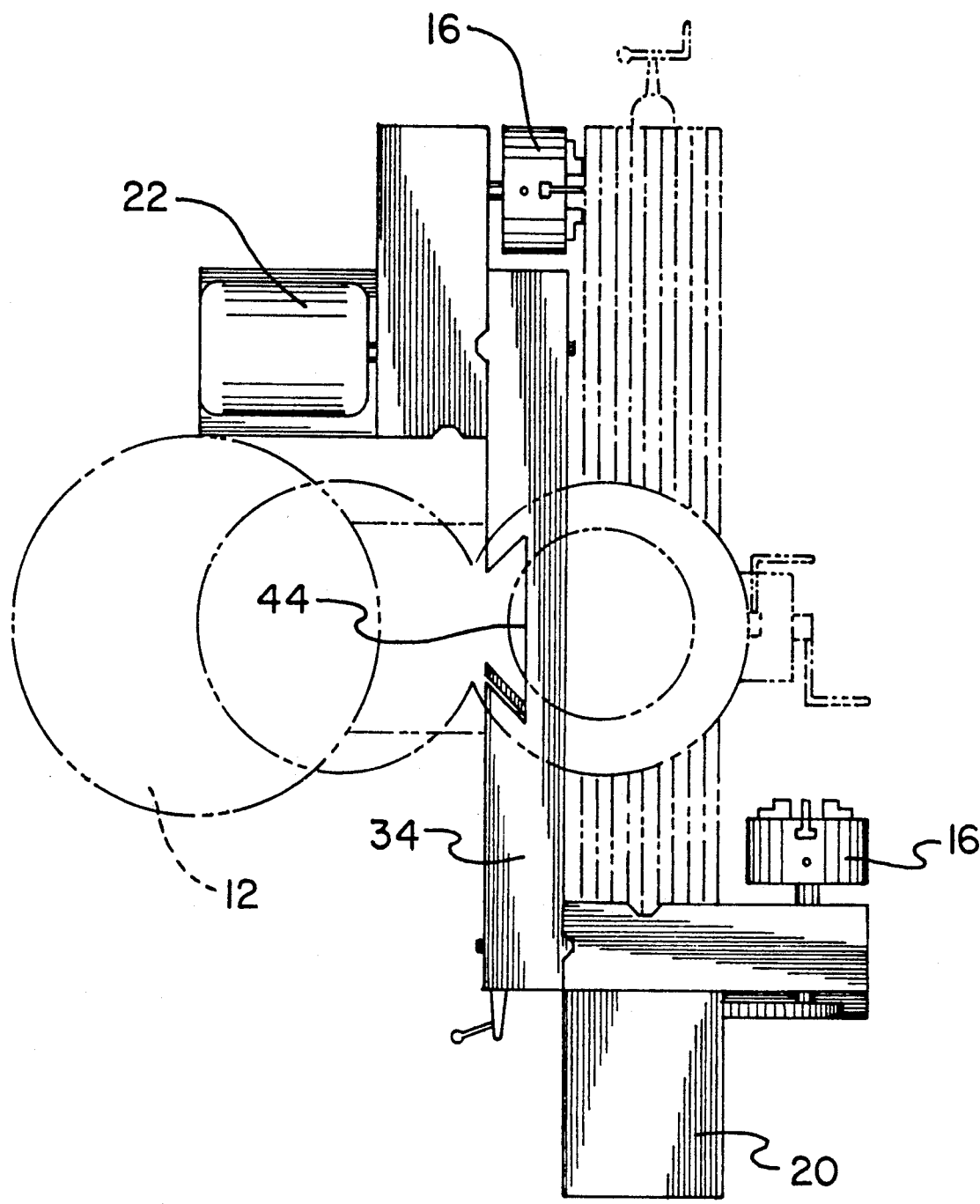
FIG. 7 is a top plan view of the invention.

The chuck support 18 is provided with a pair of attachment slots 30, 32 for facilitating a selective attachment of the support to a universal dovetail mounting block 34. The slot 30 is engageable with a ridge member 36 as best illustrated in FIG. 2 and threaded attachment means are used in a conventional manner to hold the ridge 36 within the slot 30. Alternatively, as best illustrated in FIG. 7, the chuck support 18 can be removed and reattached to a further ridge member 38 through an engagement of slot 32 therewith, whereby a different alignment of the lathe chuck 16 relative to the milling machine 12 can be achieved. Again, threaded attachment members may be utilized in a conventional manner to achieve this interconnection, and these threaded attachment members are directed through a pair of apertures 40, 42. Preferably, recessed set screws would be located in the apertures 40, 42 as well as the unillustrated apertures which facilitate an attachment of ridge member 36 within slot 30.

It can be further seen that the universal dovetail mounting block 34 is provided with a dovetail slot 44 engageable with dovetail connectors already present on the milling machine 12. A shoe member 46 is threadably moveable into engagement with the existing milling machine dovetails to achieve a locking of the universal dovetail mounting block 34 to the milling machine 12 through the rotation of a pair of threaded movement members 48, 50. The rotation of the handle members 48, 50 allows the shoe member 46 to move into engagement with an existing dovetail thereby to achieve the above mentioned locking engagement.

In use, it can be seen that the milling machine lathe attachment 10 can be operably attached to an existing milling machine 12 and through a powering of the electric motor 22, the lathe chuck member 16 will rotate in the manner of a lathe. As best illustrated in FIG. 7, a toolstock can be mounted in the lathe chuck 16 and can be aligned in two different orthogonally aligned directions depending upon the attachment of chuck support 18 to the universal dovetail mounting block 34. With final reference to FIG. 1, a milling machine 12 is provided with optional manual/automatic drive mechanisms 52, 54 whereby directional movement of the table 14 can be achieved in a precision manner. With toolstock mounted in the lathe chuck 16, the table 14 can be made to move upwardly or downwardly, as well as horizontally and, with a tool bit attached to the table 14 in a known manner, the toolstock mounted in the lathe chuck 16 can be milled or cut to any desired shape. Greater precision is available through this type of arrangement as opposed to using a conventional lathe.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved milling machine attachment which facilitates the use of said milling machine as a lathe, said attachment including:

mounting means for facilitating an attachment to said milling machine;

lathe means attached to said mounting means; and power supply means for driving said lathe means;

wherein said mounting means comprises a rectangular shaped support member having first and second opposed ends and first and second opposed sides, said support member further having a longitudinal axis and a transverse axis perpendicular to said longitudinal axis, said support member having a dovetailed shaped recess extending parallel to said transverse axis on one of said sides thereof, said support member dovetailed shaped recess adapted to be affixed to the vertically extending dovetail of said milling machine with said other opposed side thereof facing outwardly with respect to said milling machine vertical dovetail;

said support member having a first ridge member defining a first external supporting surface extending orthogonally with respect to said longitudinal axis thereof on a first side of said support member proximal to one of said opposed ends thereof and a second ridge member defining a second external supporting surface extending orthogonally with respect to said longitudinal axis thereof on a second opposed side of said support member proximal to the other of said opposed ends thereof;

wherein said lathe means comprises a lathe support member having opposed ends, a chuck rotatably mounted near one of said ends of said lathe support member whereby the rotation axis of said chuck extends orthogonally with respect to the longitudinal axis of said lathe support member passing axially through said opposed ends thereof, said power supply means comprising motor means mounted on said support member, and transmission means extending between said motor means and said rotatably mounted chuck; and wherein said lathe support member has a first mounting recess and a second mounting recess extending parallel and at right angles to said first mounting recess whereby said lathe support member may be supported relative to said mounting means support member by causing either of said first and second mounting recesses to selectively engage said first or second ridge members on said support member.

2. The new and improved lathe attachment of claim 1 further including attachment means for affixing either of said first and second ridge members within either of said lathe support member recesses on said lathe support member, said attachment means comprising aligned openings in said ridge member and said recesses, and threaded fastening members adapted to be fixedly disposed in said aligned openings.

* * * * *